United States Patent
Kolmanovsky et al.

(10) Patent No.: US 6,188,944 B1
(45) Date of Patent: Feb. 13, 2001

(54) TORQUE CONTROL STRATEGY FOR ENGINES WITH CONTINUOUSLY VARIABLE TRANSMISSION

(75) Inventors: Llya V. Kolmanovsky, Ypsilanti; Jing Sun, Bloomfield; Leyi Wang, Novi, all of MI (US)

(73) Assignee: Ford Motor Company, Dearborn, MI (US)

( * ) Notice: Under 35 U.S.C. 154(b), the term of this patent shall be extended for 0 days.

(21) Appl. No.: 09/323,239

(22) Filed: Jun. 1, 1999

(51) Int. Cl.$^7$ ...................................... F01N 3/00
(52) U.S. Cl. ................. 701/54; 701/56; 477/43; 477/100
(58) Field of Search ................ 701/54, 56, 65; 477/37, 43, 100, 101, 107; 60/274, 602

(56) References Cited

U.S. PATENT DOCUMENTS

| | | | |
|---|---|---|---|
| 5,243,881 | * 9/1993 | Hayashi | 74/856 |
| 5,468,195 | * 11/1995 | Kashiwabara | 477/46 |
| 5,655,992 | * 8/1997 | Hattori | 477/107 |
| 5,778,857 | * 7/1998 | Nakamura et al. | 123/425 |
| 5,875,761 | * 3/1999 | Fujieda et al. | 123/399 |
| 5,910,096 | * 6/1999 | Hepburn et al. | 60/274 |
| 5,967,113 | * 10/1999 | Kaneko et al. | 123/295 |
| 6,063,004 | * 5/2000 | Ibamoto et al. | 477/47 |
| 6,067,800 | * 5/2000 | Kolmanovsky et al. | 60/602 |
| 6,079,204 | * 6/2000 | Sun et al. | 60/274 |

* cited by examiner

*Primary Examiner*—Tan Nguyen
(74) *Attorney, Agent, or Firm*—Jerome R. Drouillard; Allan J. Lippa

(57) ABSTRACT

A method and system for controlling torque disturbances in direct injection stratified charge and lean burn port-fuel injection engines (12) through continuously variable transmission (40). The method and system include using the continuously variable transmission (40) to mitigate the effects of torque disturbances due to a lean $NO_x$ trap (22) purge cycle (100). The continuously variable transmission (40) is coordinated with other engine variables, such as throttle (36), fueling rate ($W_f$), injection timing ($\gamma$), and spark timing ($\delta$), to keep the operation near the optimal regime. In periods of trap (22) purge, the engine control variables and the continuously variable transmission (40) are coordinated to maximize purge efficiency for a predetermined period of time. In periods of normal operation (102), the engine control variables and the continuously variable transmission (40) are coordinated to minimize fuel consumption subject to emission constraints.

14 Claims, 4 Drawing Sheets

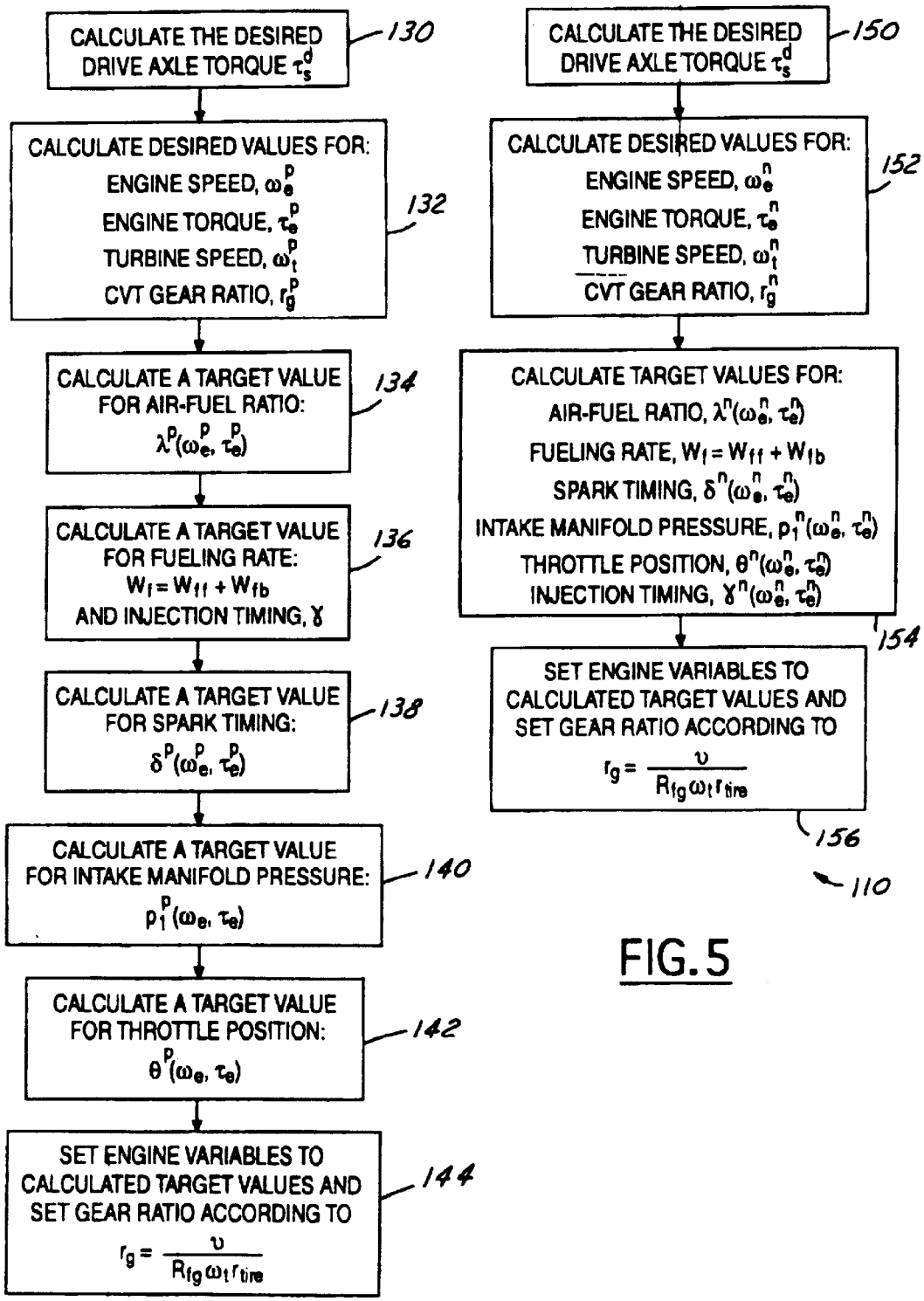

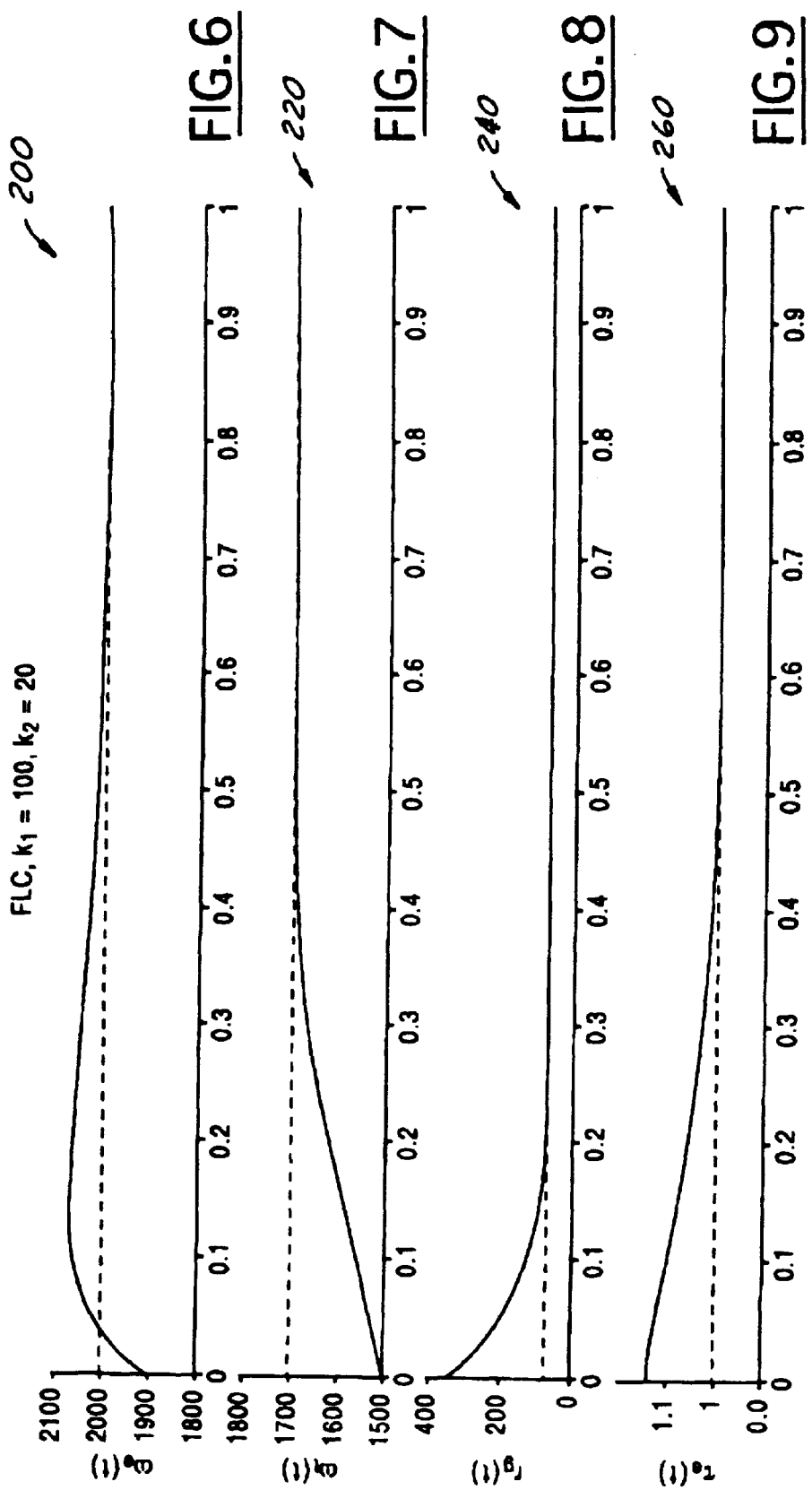

TORQUE CONTROL STRATEGY FOR ENGINES WITH CONTINUOUSLY VARIABLE TRANSMISSION

FIELD OF THE INVENTION

The present invention relates generally to engines having continuously variable transmission, and more particularly to a torque control strategy for gasoline direct injection stratified charge and lean burn port-fuel injected engines with continuously variable transmission.

BACKGROUND OF THE INVENTION

Precious metal oxidation catalysts are generally used as a means for removing pollutants from the exhaust gas of an internal combustion engine. These oxidation catalysts remove CO, HC, and $NO_x$ simultaneously from engine exhaust gases when the air-fuel ratio of the exhaust gas is at a stoichiometric air-fuel ratio. The ability of oxidation catalysts to remove $NO_x$ in the exhaust gas falls rapidly, however, when the air-fuel ratio of the exhaust gas becomes leaner. Therefore, in engines operating in a lean air-fuel ratio environment, such as a direct injection stratified charge engine (DISC) or other lean-burn engine technologies, it is difficult to remove $NO_x$ from the exhaust gas using a conventional oxidation catalyst.

Accordingly, to achieve $NO_x$ control, exhaust aftertreatment systems have included a lean $NO_x$ trap (LNT). Presently, however, the LNT is only a trapping device during the lean operation. The LNT must be purged periodically in order to maintain its level of efficiency. To meet the purge requirement, the DISC or lean burn engine has to run at an air-to-fuel ratio rich of stoichiometry periodically during lean operation. In addition, the LNT has a very narrow operating temperature range beyond which the LNT trapping capacity and efficiency is greatly reduced.

For a DISC engine running in a stratified mode, the LNT is typically purged by running the engine rich of stoichiometry for 2-3 seconds every 50 seconds. The engine control system has to manage this purge cycle without causing noticeable torque disturbance to the vehicle. Prior art approaches to this problem involve the use of an electronic throttle, or other electrical supplemental torque devices, for example, a combined alternator-starter.

SUMMARY OF THE INVENTION

It is an object of the present invention to actively enhance engine performance and improve fuel economy and emissions. It is another object of the present invention to use continuously variable transmission (CVT) to mitigate the effects of torque disturbances due to the LNT purge cycle.

It is a further object of the present invention to provide a control strategy that combines the CVT with other engine control variables to optimize fuel consumption during the steady state operation of the engine and to minimize drivetrain disturbance during transient operation.

The foregoing and other objects and advantages are achieved through using the CVT as an additional actuator for torque and temperature management during the LNT purge cycle to mitigate torque disturbances from DISC engines. By adjusting the gear ratio and thus managing the engine load in response to the engine torque variation, the CVT can isolate the engine torque disturbance and prevent it from being transmitted to the vehicle drivetrain. Other engine control variables, such as the throttle, spark and fuel, are coordinated with the CVT gear actuation to keep the engine and transmission operating near the optimal regime where fuel consumption and emissions are minimized.

One advantage of the present invention is that it reduces emissions and improves fuel economy. Another advantage is that it maintains constant, desired torque to the wheels for improved drivetrain performance during transients.

Other features and advantages of the present invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention. In the drawings:

FIG. 4 is a flow chart representing one embodiment of the control strategy of the present invention as it relates to the regeneration phase of the LNT purge cycle;

FIG. 5 is a flow chart representing one embodiment of the control strategy of the present invention for the engine and transmission state recovery phase of the LNT purge cycle;

FIG. 6 is a plot of the engine speed versus time;

FIG. 7 is a plot of the turbine speed versus time;

FIG. 8 is a plot of the gear ratio versus time; and

FIG. 9 is a plot of the engine torque versus time.

DESCRIPTION OF THE PREFERRED EMBODIMENT(S)

The control strategy of the present invention provides a method of rejecting drivetrain disturbance and allows coordination of engine and transmission control sub-systems. The present invention utilizes the CVT to prevent torque perturbation from being transmitted to the vehicle dynamics to provide further control as an assurance of optimum vehicle performance. The present invention uses the CVT as a control variable, in addition to the throttle, spark, and air-fuel ratio to shift the engine operating conditions. The present invention provides a more efficient purge operation that is not constrained by the need for a constant engine torque during the LNT regeneration phase. It is also possible to move the engine operating condition to more thermodynamic efficient points during normal engine operation.

Figure 1:
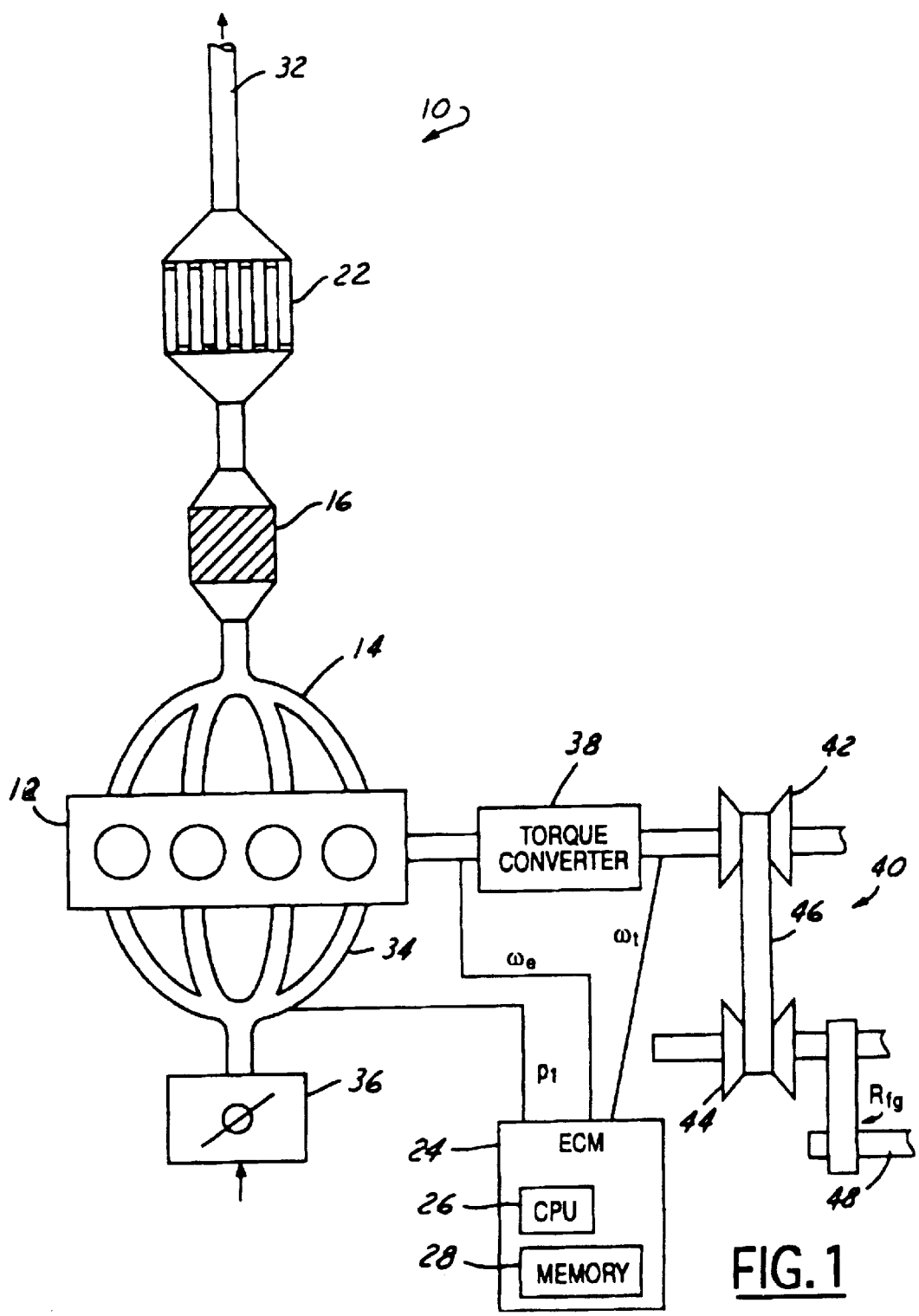
FIG. 1 is a plan view of an exhaust system according to one embodiment of the present invention illustrating its operational relationship with an internal combustion engine.

Referring to FIG. 1, there is shown an example of an exhaust system 10 for use with the control strategy of the present invention. The exhaust system 10 is illustrated in operational relationship with an internal combustion engine 12 such as a direct injection stratified charge (DISC) leanburn engine for an automotive vehicle. In this example, the engine 12 has an exhaust manifold 14 to direct the exhaust gases from the engine 12 to the exhaust system 10. Closely coupled to the exhaust manifold is a three-way catalyst 16 such as a conventional precious metal oxidation catalyst. The three-way catalyst 16 functions to oxidize the majority of the HC and CO as well as a portion of the $NO_x$ in the exhaust flow once the temperature of the three-way catalyst 16 reaches its operational range. The exhaust system 10 further includes a $NO_x$ trap 22. Preferably, $NO_x$ trap 22 is an integral $NO_x$ trap and particulate matter filter capable of absorbing exhaust gas $NO_x$ and filtering particulate matter emissions.

The sulfur level in the $NO_x$ trap 22 is continuously monitored. When the $NO_x$ trap absorption efficiency falls below a critical level, the ECM 24 initiates a $NO_x$ trap desulfation event. During such time, the engine air-fuel ratio is operated at a rich set point.

The $NO_x$ purge is accomplished by controlling the engine air-fuel ratio to a value rich of stoichiometry. The mode transition between lean operation and rich operation is rapid, typically lasting one or two seconds. Unless the transition is carefully controlled, engine torque variations may result, which may affect the operation of the vehicle.

A throttle 36 controls the amount of air that enters intake manifold 34 and is eventually mixed with fuel in the engine cylinders. A torque converter 38 and a continuously variable transmission (CVT) 40 smooth out torque differences through an adjustable gear ratio. In the implementation of the CVT shown in FIG. 1, a first pulley 42 has a radius that is adjusted relative to the radius of a second pulley 44 affecting the movement of a belt 46, providing a continuously variable gear ratio to a drive axle 48.

Unlike conventional transmissions, the gear ratio of a CVT 40 can be varied continuously within a range, and therefore can be used to actively enhance performance and improve fuel economy and emission. By adjusting the gear ratio and managing the engine load in response to the engine torque variation, the CVT 40 can isolate the engine torque disturbance and prevent it from being transmitted to the vehicle drivetrain.

Figure 2:
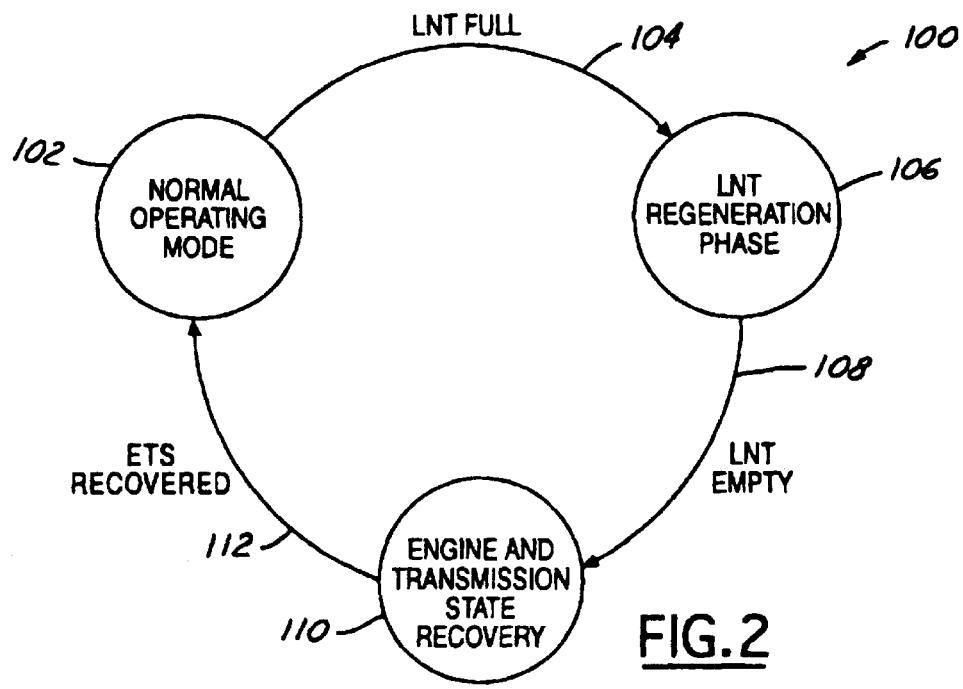
FIG. 2 is a flow chart representing the purge cycle for an automotive engine used in conjunction with the control strategy of the present invention.

FIG. 2 is a flow diagram representing the modes of operation and the transitions of the LNT purge cycle 100. The engine operates in a normal operating mode 102 until the LNT becomes full 104. The LNT becomes full when the estimated mass of $NO_x$ in the trap exceeds a predetermined threshold value. At this point, an LNT regeneration phase 106, also known as a purge mode, is initiated. The LNT regeneration phase 106 occurs when the LNT is emptied out of stored $NO_x$ 108 by running the engine rich of stoichiometry for several seconds. The purge cycle then enters an engine and transmission state recovery phase 110 as the engine returns 112 to the lean, or stratified, normal operation mode 102.

During the LNT regeneration phase 106, the engine control variables are managed by the control strategy of the present invention so that the LNT purge is accomplished in the most efficient manner allowable without causing excessive engine speed and torque disturbances. A standard approach in the prior art during LNT purge is to keep the engine torque constant as the engine undergoes LNT purge. The control strategy of the present invention is very much different. The control strategy of the present invention utilizes the CVT to allow the engine speed and engine torque to vary within a predetermined range during the short period of time the purge cycle is operating. This allows the LNT purge to be carried out more efficiently without the constraint of constant torque.

In the engine and transmission state recovery phase 110, the control strategy of the present invention brings the engine and transmission states to their optimal settings, which correspond to optimal fuel economy and emission operating points. The CVT gear ratio control and engine torque/speed controls are coordinated by the control strategy so that the transition during the recovery phase does not cause a noticeable disturbance in the vehicle's operation.

The control strategy of the present invention is best described in conjunction with an engine/drivetrain dynamic model. Let v be the vehicle speed. It satisfies the dynamic equation:

$$J_v v(\text{derivative}) = \tau_s - k_v v - \tau_b - \tau_d,$$

Where $\tau_s$ is the axle shaft torque delivered from the CVT to the vehicle, $\tau_b$ is the torque from the vehicle braking system, $\tau_d$ is the torque representing the air drag and road rolling resistance effect, $J_v$ and $k_v$ are drivetrain constants. The axle shaft torque is related to other engine and CVT variables through:

$$\tau_s = \tau_{s1} + \tau_{s2}$$

$$\tau_{s1}(\text{derivative}) = k_s s_t$$

$$\tau_{s2} = b_s s_t$$

where $k_s$ and $b_s$ are drivetrain effective spring and damping constants, and $s_t$ is the drive shaft twist defined as:

$$s_t = r_g R_{fg} \omega_t r_{tire} - v$$

$r_g$ is the CVT gear ratio, $R_{fg}$ is the final drive speed reduction ratio, $\omega_t$ is the turbine speed of the torque converter, and $r_{tire}$ is the tire radius.

During the engine transient operation, if the gear ratio, $r_g$, is adjusted so that the drive axle twist, $s_t$, is zero, i.e., $$r_g = v[R_{fg} \omega_t r_{tire}]^{-1}, s_t = r_g R_{fg} \omega_t r_{tire} - v = 0$$

then, $\tau_s$, the torque that drives the vehicle, will remain constant despite the changes in the engine torque or the turbine speed. However, this simplistic CVT control strategy may have serious stability problems. Other engine variables such as engine speed and torque converter turbine speed may drift away from their optimal settings thereby causing additional instability in the system. A solution is proposed by the control strategy of the present invention that simultaneously rejects the disturbance in the drivetrain and maintains the system stability near the operating setpoint.

In order to illustrate this solution, consider a typical scenario where the vehicle is in steady state cruise operation. It should be noted that this description is for illustration purposes only and that the control strategy of the present invention is not limited to only steady state cruise operation only. In steady state cruise operation, the engine is running in the lean homogeneous or stratified combustion mode, and the LNT is purged periodically. To accomplish the transition to purge the control strategy must change the air-to-fuel ratio from nominally lean to slightly rich of stoichiometry value. It may also have to adjust a number of other engine inputs.

Figure 3:
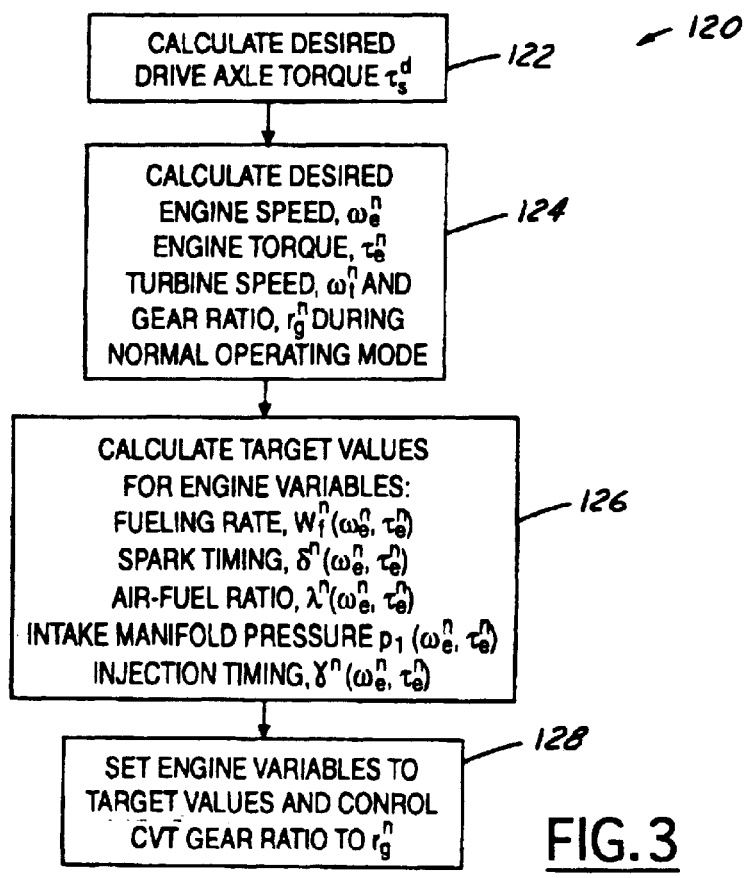
FIG. 3 is a flow chart representing one embodiment of the control strategy of the present invention.

In general, the control strategy 120 of the present invention is described with reference to FIG. 3. In the normal mode, a desired drive axle torque, $\tau_s^d$, is calculated 122 based on the pedal position and the vehicle velocity. From the desired drive axle torque, setpoints are calculated 124. The setpoints are the desired values for engine speed, $\omega_e$, engine torque, $\tau_e$, turbine speed, $\omega_t$, and gear ratio, $r_g$. Target values for engine variables, such as air-fuel ratio, fueling rate and timing, spark timing, and intake manifold pressure, are calculated 126 as functions of a measured vehicle speed and an demanded engine torque value. Finally, the engine variables are set 128 to the target values. The CVT gear ratio is controlled to its setpoint value.

The setpoints can be defined as a purge setpoint ($r_g^P$, $\omega_e^P$, $\omega_t^P$) relating to the LNT regeneration phase and a normal setpoint ($r_g^n$, $\omega_e^n$, $\omega_t^n$) relating to engine and transmission recovery phase and normal operating mode. The setpoints correspond to purge and normal (lean) operation. The purge setpoint is calculated to maximize the purge efficiency operation mode within a short period of time by considering the constraints such as the LNT temperature window and three-way catalyst CO breakthrough. The normal setpoint is determined to minimize the fuel consumption with emission constraints. The setpoints will depend on the engine load and the vehicle's pedal position, and can be calculated off-line according to engine and CVT mapping data.

For a given setpoint, engine control variables such as throttle, fueling rate, injection timing, and spark, can be determined so that the estimated engine speed/torque and turbine speed will match the setpoint. An engine control variable, $u_c$, is defined as a purge calibration, $u_c^P$, that corresponds to the setpoint ($r_g^P$, $\omega_e^P$, $\omega_t^P$), and a normal calibration, $u_c^n$, that corresponds to the setpoint ($r_g^n$, $\omega_e^n$, $\omega_t^n$). Both the setpoints and the engine control variables are stored in the ECU memory 28, as functions of engine load and driver's pedal position, either in the form of regressions or look-up tables. The control strategy of the present invention uses the stored information together with measured information from the engine and the CVT to control the torque and minimize disturbances.

FIG. 4 diagrams and outlines the control strategy of the present invention during the LNT regeneration phase 106. The desired drive axle torque, $\tau_s^d$, is calculated 130. The desired values are calculated 132 for the engine speed, $\omega_e^P$, engine torque, $\tau_e^P$, turbine speed, $\omega_t^P$, and CVT gear ratio, $r_g^P$.

A target value is calculated 134 for air-fuel ratio, $\lambda^P(\omega_e^P, \tau_e^P)$ rich of stoichiometry. Typically, the target air-fuel ratio does not vary much with engine speed and torque values.

A target value for the fueling rate, $W_f^P(\omega_e^P, \tau_e^P)$, is calculated 136 as a sum of a feedforward term and a feedback term:

$$W_f = W_{ff} + W_{fb}$$

where, for example, $$W_{ff} = W_{1e}[\lambda^P(\omega_e^P, \tau_e^P)]^{-1}$$

to bring the air-fuel ratio to the target value. $W_{1e}$ is the estimated airflow from the engine intake manifold into the engine cylinders. The feedback term is:

$$W_{fb} = f(\omega_e^P - \omega_e)$$

and is applied if the value $|\omega_e - \omega_e^P|$ exceeds a predetermined threshold value, which is an indication of engine/transmission state drifting. The nonlinear function $f_{p1}$ is designed so that it is non-decreasing with $|\omega_e - \omega_e^P|$, zero for small values of $|\omega_e - \omega_e^P|$, and continuous. The feedback term, $W_{fb}$, prevents the engine speed and the turbine speed from drifting too far away from nominal values.

Target values are then calculated for the spark timing 138, $\delta^P(\omega_e^P, \tau_e^P)$, the intake manifold pressure 140, $p_1^P(\omega_e, \tau_e)$ and the throttle position 142, $\Theta^P(\omega_e, \tau_e)$, where $\tau_e$ is the estimated value of engine torque.

Finally, the engine variables are set 144 to their calculated target values. The throttle value is set according to a Proportional-Plus-Integral control law that forces the intake manifold pressure to follow the target value. The control law is as follows:

$$\Theta(k\Delta T) = \Theta^P(\omega_e(k\Delta T), \tau_e(k\Delta T)) + k_{p2}(p_1(k\Delta T) - p_1^P(\omega_e(k\Delta T), \tau_e(k\Delta T))) + k_{i2}z(k\Delta T),$$

$$z((k+1)\Delta T) = z(k\Delta T) + (p_1(k\Delta T) - p_1^P(\omega_e(k\Delta T), \tau_e(k\Delta T))),$$

where $\Delta T$ is the sampling rate and $k_{p2}$ and $k_{i2}$ are gains.

When the LNT purge cycle is completed, the engine/CVT state recovery phase begins so that the system returns to normal setpoints for minimizing fuel consumption, subject to emissions constraints, as is the primary objective of the present invention.

Referring now to FIG. 5, the control strategy of the present invention is described during the state recovery phase 110. The desired drive axle torque, $\tau_s^d$, is calculated 150. The desired values are calculated 152 for the engine speed, $\omega_e^n$, engine torque, $\tau_e^n$, turbine speed, $\omega_t^n$, and CVT gear ratio, $r_g^n$.

The target values for the engine variables are calculated 154. The engine variables include, $\lambda^n(\omega_e^n, \tau_e^n)$, the fueling rate, $W_f$, the injection timing, $\gamma^n$, the spark timing, $\delta^n(\omega_e^n, \tau_e^n)$, the intake manifold pressure, $p_1^n(\omega_e^n, \tau_e^n)$ and the throttle position, $\Theta^n(\omega_e^n, \tau_e^n)$.

The fueling rate during the engine transmission state recovery phase 110 is calculated as a sum of a feedforward term and a feedback term:

$$W_f = W_{ff} + W_{fb}$$

where, for example, $$W_{ff} = W_{1e}[\lambda^n(\omega_e^n, \tau_e^n)]^{-1}$$

or, the feedforward term can be set to:

$$W_{ff} = W_f^n(\omega_e^n, \tau_e^n)$$

$W_{1e}$ is the estimated airflow from the engine intake manifold into the engine cylinders.

To enforce the engine/CVT operation at the optimal setting for the normal mode, a feedback, which depends on $\omega_e - \omega_e^n$ and $\omega_t - \omega_t^n$, is used during the engine/CVT state recovery phase. The feedback term can be set to:

$$W_{fb} = k_{fe}(\omega_e - \omega_e^n) + k_{ft}(\omega_t - \omega_t^n)$$

where $k_{fe}$ and $k_{ft}$ may be nonlinear gains. It should be noted that the feedback algorithm described herein is for example purposes only and there are several possibilities for a feedback algorithm as known by one of ordinary skill in the art.

The feedback gains, $k_{fe}$ and $k_{ft}$, can be determined either by computer-aided control design with the assistance of an engine/CVT model, or by in-vehicle calibration. In the LNT regeneration phase, the engine speed is sufficient to prevent the engine/CVT state from drifting away. In the state recovery phase, both engine speed and turbine speed are used for engine torque feedback control because not only is the system stability a concern, but the performance, i.e. how fast the engine/CVT is brought back to optimal settings, is also a concern. The engine speed feedback is sufficient to stabilize the system, and a combination of the engine speed and torque converter turbine speed is necessary to optimize the system performance.

After calculating target values 154, the engine variables are set 156 to the calculated target values. The throttle value is set according to a Proportional-Plus-Integral control law that forces the intake manifold pressure to follow the target value:

$$\Theta(k\Delta T) = \Theta^n(\omega_e(k\Delta T), \tau_e(k\Delta T)) + k_{p3}(p_1(k\Delta T) - p_1^n(\omega_e^n, \tau_e^n)) + k_{i3}z(k\Delta T),$$

$$z((k+1)\Delta T) = z(k\Delta T) + (p_1(k\Delta T) - p_1^n(\omega_e^n(k\Delta T), \tau_e^n(k\Delta T))),$$

where $k_{p3}$ and $k_{i3}$ are gains.

FIGS. 6 through 9 are examples of the system response using the control strategy of the present invention. FIG. 6 is a plot 200 of the performance of the feedback controller for the engine/CVT state recovery of engine speed versus time $\omega_e(t)$. FIG. 7 is a plot 220 of the turbine speed versus time $\omega_t(t)$. FIG. 6 is a plot 240 of the gear ratio versus time $r_g(t)$. FIG. 9 is a plot 260 of the engine torque versus time $\tau_e(t)$.

While the present invention has been described herein with reference to a CVT and DISC or lean burn engine control in the context of LNT purge and cruise operation, it is not limited to this particular application. The control strategy of the present invention can be applied to any transient operation where the engine and torque converter operations cause undesirable disturbances in the drivetrain.

It is to be understood that the present invention is not limited to the embodiments described herein. The invention covers all alternatives, modifications, and equivalents, as may be included within the spirit and scope of the appended claims. In particular, additional actuators on the engine side such as an exhaust gas re-circulation valve or variable cam timing may be included.

What is claimed is:

1. A method of minimizing torque disturbances in an internal combustion engine for a vehicle having a lean $NO_x$ trap that is periodically purged and a continuously variable transmission, said method comprising the steps of:
   calculating a desired drive axle torque;
   calculating a setpoint for predetermined engine characteristics based on said desired drive axle torque;
   calculating target values for predetermined engine variables based on said setpoint; and
   setting said engine variables to said target values to compensate for torque disturbances that result from said lean $NO_x$ trap purge cycle.

2. The method as claimed in claim 1 wherein said step of calculating target values further comprises calculating a target value for a fuel rate, a spark timing and a throttle position.

3. The method as claimed in claim 2 wherein said step of calculating target values for a fueling rate further comprises calculating a fueling rate as a sum of a feedforward term and a feedback term.

4. The method as claimed in claim 3 wherein said feedback term is applied when one of said engine speed, said turbine speed or said gear ratio exceeds a predetermined threshold value.

5. The method as claimed in claim 2 wherein said step of setting said engine variables to said target values further comprises setting said throttle value according to a proportional plus integral control law.

6. The method as claimed in claim 2 wherein said step of calculating target values further comprises calculating said target values as functions of a measured engine speed and an estimated engine torque.

7. The method as claimed in claim 1 wherein said step of calculating a setpoint for predetermined engine characteristics further comprises:
   calculating a desired engine speed based on said desired drive axle torque;
   calculating a desired engine torque based on said desired drive axle torque;
   calculating a desired turbine speed based on said desired drive axle torque; and
   calculating a gear ratio for said continuously variable transmission based on said desired drive axle torque.

8. The method as claimed in claim 7 wherein said step of calculating a setpoint further comprises calculating a setpoint to maximize purge efficiency within a predetermined period of time.

9. The method as claimed in claim 7 wherein said step of calculating a setpoint further comprises calculating a setpoint to minimize fuel consumption.

10. The method as claimed in claim 7 wherein said desired values for said engine speed, engine torque, turbine speed, and gear ratio are calculated from values stored in lookup tables.

11. The method as claimed in claim 7 wherein said steps of calculating desired values and target values further comprises calculating said desired values and said target values based on an operating mode of said lean $NO_x$ trap purge cycle.

12. The method as claimed in claim 11 wherein said operating mode of said lean $NO_x$ trap is emptied of stored $NO_x$ and said desired values for engine speed, turbine speed, engine torque and gear ratio are calculated such that purge efficiency is maximized within a predetermined period of time.

13. The method as claimed in claim 11 wherein said operating mode of said lean $NO_x$ trap is during a period when said engine is returning to normal operation and said desired values for engine speed, turbine speed, engine torque and gear ratio are calculated such that fuel consumption with emission constraints is minimized.

14. A torque control system for a vehicle comprising:
   a direct injection stratified charge engine comprising;
   an exhaust gas purification system having a $NO_x$ trap for absorbing a $NO_x$ component in the exhaust gas of said engine, said $NO_x$ trap being purged at predetermined intervals; and
   a continuously variable transmission for adjusting a gear ratio thereby controlling a torque of said engine during periods of $NO_x$ trap purge.

* * * * *